United States Patent
Wheeler et al.

(10) Patent No.: US 10,926,712 B2
(45) Date of Patent: Feb. 23, 2021

(54) MOUNTING SOLUTIONS FOR MOUNTING AUDIO ACTUATORS INSIDE VEHICLE BODY COMPONENTS

(71) Applicant: FORD GLOBAL TECHNOLOGIES, LLC, Dearborn, MI (US)

(72) Inventors: Joshua Wheeler, Trenton, MI (US); John Wayne Jaranson, Dearborn, MI (US); Michael Musa Azzouz, Dearborn Heights, MI (US); Ireneusz Trybula, South Lyon, MI (US); Scott Andrew Amman, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/412,716

(22) Filed: May 15, 2019

(65) Prior Publication Data

US 2020/0361395 A1    Nov. 19, 2020

(51) Int. Cl.
*B60R 11/02* (2006.01)
*H04R 1/02* (2006.01)
*B60Q 9/00* (2006.01)
*B60Q 5/00* (2006.01)
(Continued)

(52) U.S. Cl.
CPC .............. *B60R 11/02* (2013.01); *B60Q 5/00* (2013.01); *B60Q 9/00* (2013.01); *H04R 1/025* (2013.01); *B60J 5/042* (2013.01); *B60R 2011/0021* (2013.01); *B60R 2011/0077* (2013.01); *H04R 2499/13* (2013.01)

(58) Field of Classification Search
CPC .............. B60R 11/02; B60R 2011/021; B60R 2011/0077; B60J 5/042; B60Q 5/00; B60Q 9/00; H04R 1/025; H04R 2499/13
See application file for complete search history.

(56) References Cited

U.S. PATENT DOCUMENTS 7,313,247 B1 * 12/2007 Tilli ....................... H04R 1/025
                                                          381/386
8,247,930 B2 *  8/2012 Yamagishi ............. H04R 9/066
                                                          310/12.16
9,616,813 B2 *  4/2017 Kang .................. B60R 11/0217
(Continued)

FOREIGN PATENT DOCUMENTS

DE         19717908 A1    10/1998
FR         3016555 A1      7/2015
(Continued)

OTHER PUBLICATIONS

Audio Exciters; seven pages; https://www.tectonicaudiolabs.com/audio-components/audio-exciters/.

*Primary Examiner* — Brian Ensey
(74) *Attorney, Agent, or Firm* — David Coppiellie; Carlson, Gaskey & Olds

(57) ABSTRACT

This disclosure is directed to audio actuator assemblies that include bridging brackets for mounting audio actuators inside vehicle body components. In some embodiments, the vehicle body component is a door that includes a reinforcement beam. The bridging bracket is mountable to the reinforcement beam in order to secure the audio actuator in place inside the vehicle body component in a manner that allows the audio actuator to vibrate adjacent surfaces of the vehicle body component for radiating sound signals.

15 Claims, 4 Drawing Sheets

(51) Int. Cl.
*B60J 5/04* (2006.01)
*B60R 11/00* (2006.01)

(56) References Cited

U.S. PATENT DOCUMENTS

| | | |
|---|---|---|
| 10,049,654 B1 | 8/2018 | Wheeler et al. |
| 10,063,953 B1 | 8/2018 | Majkowski |
| 10,525,799 B2 * | 1/2020 | Hisamura ............... B60J 5/0463 |
| 2003/0019990 A1 * | 1/2003 | Iinuma ................ B60R 11/0223 248/309.1 |
| 2019/0106069 A1 | 4/2019 | Wheeler et al. |

FOREIGN PATENT DOCUMENTS

| KR | 200412702 Y1 | 3/2006 |
|---|---|---|
| WO | 2014096629 A2 | 6/2014 |

* cited by examiner

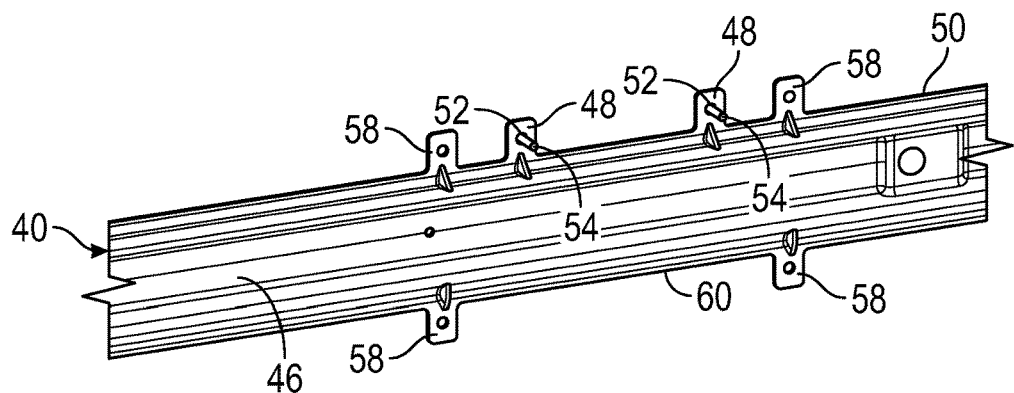
FIG. 4
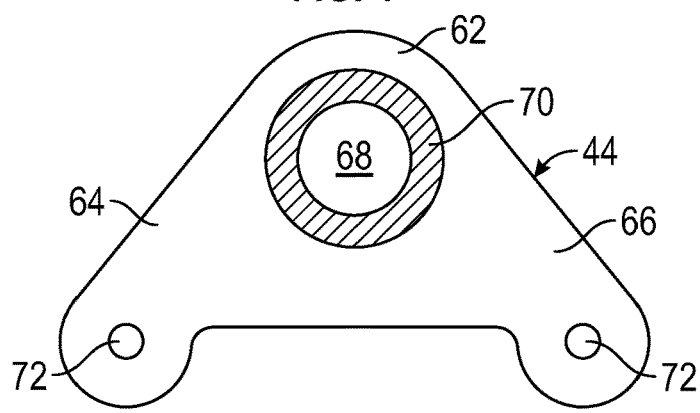
FIG. 5
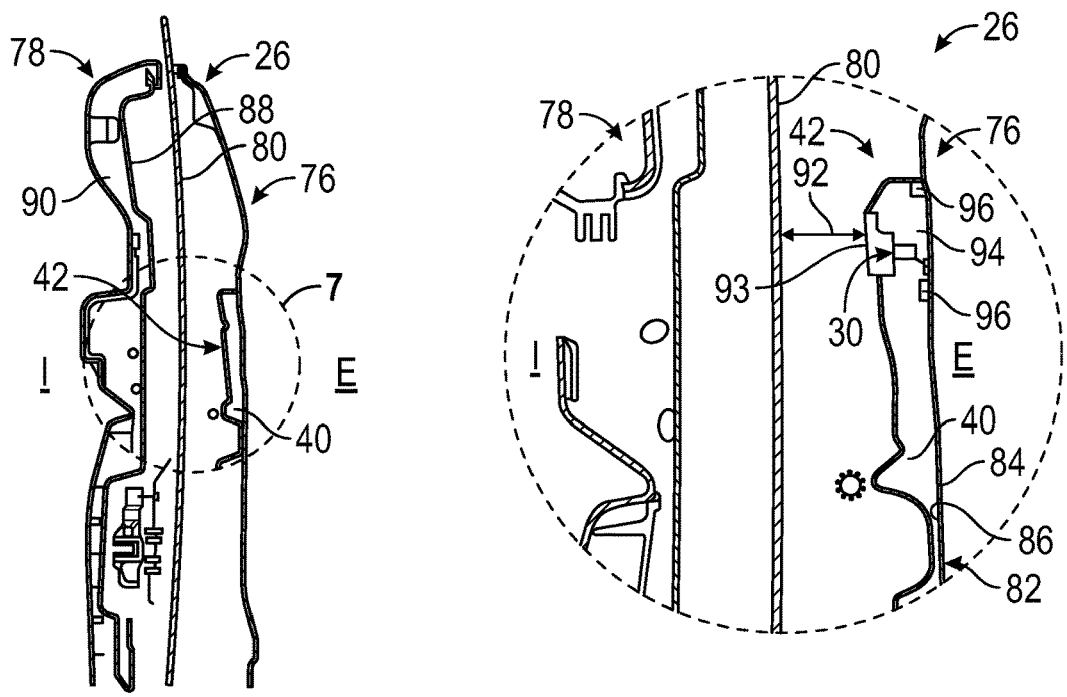
FIG. 6
FIG. 7

MOUNTING SOLUTIONS FOR MOUNTING AUDIO ACTUATORS INSIDE VEHICLE BODY COMPONENTS

TECHNICAL FIELD

This disclosure relates to vehicle communication systems, and more particularly to assemblies for mounting components of the vehicle communication systems inside vehicle body components.

BACKGROUND

Automotive vehicles include vehicle communication systems for communicating with passengers. Vehicle communication systems may include audio devices that are capable of emitting audio messages to users or pedestrians.

SUMMARY

An audio actuator assembly according to an exemplary aspect of the present disclosure includes, among other things, a bridging bracket and an audio actuator mounted within an opening of the bridging bracket.

In a further non-limiting embodiment of the foregoing assembly, the bridging bracket is mounted to a reinforcement beam of a vehicle body component.

In a further non-limiting embodiment of either of the foregoing assemblies, the vehicle body component is a door.

In a further non-limiting embodiment of any of the foregoing assemblies, the bridging bracket includes a mounting platform, a first leg, and a second leg.

In a further non-limiting embodiment of any of the foregoing assemblies, each of the first leg and the second leg includes an opening, and a mounting stud is received within each of the openings.

In a further non-limiting embodiment of any of the foregoing assemblies, the mounting studs extend from mounting tabs of a reinforcement beam of a vehicle body component.

In a further non-limiting embodiment of any of the foregoing assemblies, a nut is secured to each of the mounting studs.

In a further non-limiting embodiment of any of the foregoing assemblies, a polymeric bushing is received within the opening and disposed between the opening and the audio actuator.

In a further non-limiting embodiment of any of the foregoing assemblies, the bridging bracket is triangular shaped.

In a further non-limiting embodiment of any of the foregoing assemblies, an adhesive is attached to a surface of the audio actuator.

A vehicle according to another exemplary aspect of the present disclosure includes, among other things, a vehicle body component, a bridging bracket secured within the vehicle body component and an audio actuator mounted to the bridging bracket.

In a further non-limiting embodiment of the foregoing vehicle, the vehicle body component is a door.

In a further non-limiting embodiment of either of the foregoing vehicles, the door includes a reinforcement beam, and the bridging bracket is secured to the reinforcement beam.

In a further non-limiting embodiment of any of the foregoing vehicles, the reinforcement beam includes a mounting tab, and a mounting stud extends from the mounting tab. The bridging bracket is received over the mounting stud.

In a further non-limiting embodiment of any of the foregoing vehicles, the door includes an exterior panel that includes an interior surface and an exterior surface, and the audio actuator is mounted to the interior surface.

In a further non-limiting embodiment of any of the foregoing vehicles, an adhesive is applied between the audio actuator and the interior surface.

In a further non-limiting embodiment of any of the foregoing vehicles, the adhesive is a two-sided adhesive tape.

In a further non-limiting embodiment of any of the foregoing vehicles, the audio actuator is a vibration exciter.

In a further non-limiting embodiment of any of the foregoing vehicles, the audio actuator is received within an central opening of a mounting platform of the bridging bracket.

In a further non-limiting embodiment of any of the foregoing vehicles, a polymeric bearing is positioned between the central opening and the audio actuator.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 illustrates a door reinforcement beam.

FIG. 5 illustrates an exemplary bridging bracket of an audio actuator assembly.

FIG. 6 is a cross-sectional view of the door of FIG. 2.

FIG. 7 is a blown up view of a select portion of the door of FIG. 6.

DETAILED DESCRIPTION

This disclosure details audio actuator assemblies that include bridging brackets for mounting audio actuators inside vehicle body components. In some embodiments, the vehicle body component is a door that includes a reinforcement beam. The bridging bracket is mountable to the reinforcement beam in order to secure the audio actuator in place inside the vehicle body component in a manner that allows the audio actuator to vibrate adjacent surfaces of the vehicle body component for radiating sound signals to the outside of the vehicle. These and other features of this disclosure are described in greater detail below.

Figure 1:
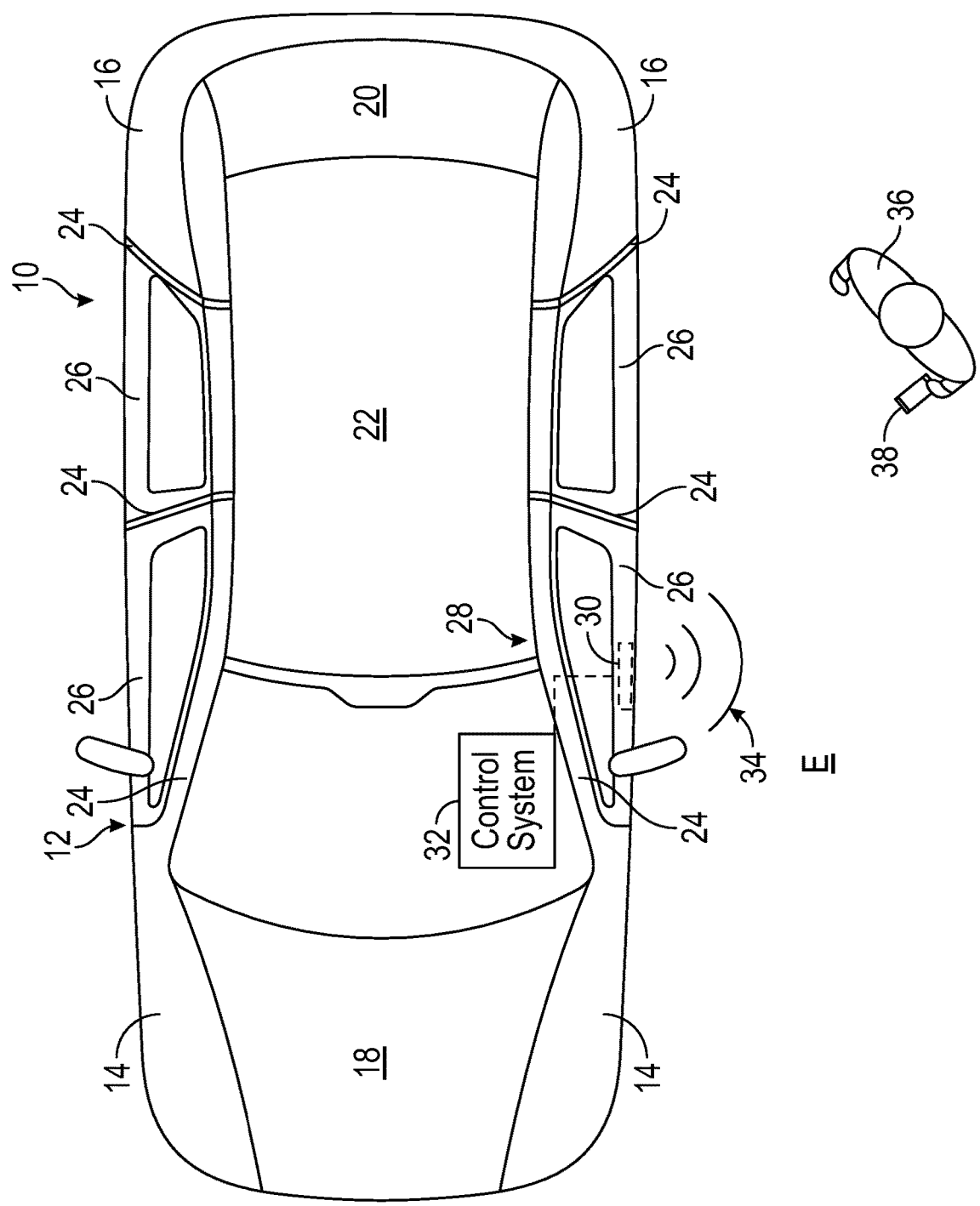
FIG. 1 schematically illustrates a vehicle equipped with a vehicle communication system that includes at least one audio actuator.

FIG. 1 schematically illustrates a vehicle 10. The vehicle 10 could be a car, a truck, a van, a sport utility vehicle, or any other type of vehicle. In an embodiment, the vehicle 10 is a conventional, internal combustion engine powered vehicle. In another embodiment, the vehicle 10 is a high voltage traction battery powered electric vehicle (e.g., battery electric vehicle (BEV), hybrid electric vehicle (HEV), plug-in hybrid electric vehicle (PHEV), etc.). In yet another embodiment, the vehicle 10 is an autonomous vehicle in which the motive functions of the vehicle 10 are controlled without direct input from a human driver.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a vehicle body 12. Among other vehicle body components, the vehicle body 12 may include front side panels 14, rear side panels 16, a hood 18, a trunk lid/lift gate 20, a roof 22, two or more pillars 24 (e.g., A-pillar, B-pillar, C-pillar, D-pillar, etc.), and two or more doors 26. The vehicle body 12 may embody a unibody construction in which the vehicle body 12 and a vehicle chassis (not shown) are integrated with one another or may be part of a body-on-frame construction in which the vehicle body 12 is separate from the vehicle chassis.

The vehicle 10 may further include a vehicle communication system 28 for communicating with passengers/users/pedestrians both inside and outside the vehicle 10. The communication system 28 may include one or more audio actuators 30 (e.g., vibration exciters) configured to radiate sound signals to the outside of the vehicle 10 by vibrating corresponding portions of the vehicle body component of the vehicle body 12 to which the audio actuators 30 are coupled. The total number of audio actuators 30 provided on the vehicle 10 is not intended to limit this disclosure.

Each audio actuator 30 may actuate upon receiving an electrical signal, such as from a control system 32 of the communication system 28. The control system 32 may include one or more control modules equipped with executable instructions for interfacing with and commanding operation of the audio actuators 30 and other components of the communication system 28. Each such control module may include a processing unit and non-transitory memory for executing the various control strategies of the components of the communication system 28. The processing unit, in an embodiment, is configured to execute one or more programs stored in the memory of the control system 32. A first exemplary program, when executed, may determine when and how to actuate each audio actuator 30 for radiating sound signals to an external environment E surrounding the vehicle 10. The control system 32 may control various other functions associated with the communication system 28.

In use, actuation of a first portion of each audio actuator 30 may transfer the vibration energy generated by the electrical signal through a second portion of each audio actuator 30, thereby vibrating the adjacent surface of the vehicle body component. Each audio actuator 30 may therefore function as a tuning fork that actuates the adjacent surface of the vehicle body component to cause that portion of the vehicle body component to form a resonant baffle of a speaker. In other words, the audio actuators 30 and the vehicle body components (e.g., doors 26, etc.) work together for radiating sound signals.

In an embodiment, each audio actuator 30 acts as a resonant baffle for assisting the broadcast of information messages 34 from the vehicle 10 to nearby users/pedestrians 36 that are located within the external environment E. The information messages 34 may be used, by way of an exemplary embodiment, to assist with onboarding and off-boarding passengers with respect to the vehicle 10 during ride-hailing events. For example, the control system 32 of the communication system 28 may communicate with a personal electronic device 38 (e.g., a key fob, cell phone, smart device, etc.) of the user/pedestrian 36 to determine whether the user/pedestrian 36 is an authorized user who requested the vehicle 10. The control system 32 includes the necessary hardware and software for performing such an authentication. If the user/pedestrian 36 is determined to be the authorized user, the control system 32 may command the audio actuators 30 to radiate the information messages 34. The information messages 34 may include a word or phrase, a chime, a series of chimes, or any combination of words and chimes. Exemplary words/phrases that may be communicated by the communication system 28 include, but are not limited to, "Welcome," "Door Unlocked, Please Enter," "Vehicle Departing, Please Stand Back," etc.

In an embodiment, the audio actuators 30 are mounted within one or more of the doors 26 of the vehicle body 12. However, the audio actuator(s) 30 could be mounted within any vehicle body component of the vehicle body 12. Many competing requirements are involved when deciding how and where to mount the audio actuators 30 relative to the vehicle body 12. These competing requirements may include but are not limited to acoustic requirements (e.g., the audio actuator 30 should be capable of efficiently transferring vibrations through rigid coupling of the actuator and the resonant baffle surface), studio requirements (e.g., the audio actuator 30 should not be visible from the outside of the vehicle 10), operational requirements (e.g., the mounting strategy should not interfere with operations of nearby components such as the retracting window), durability requirements (e.g., the mounting strategy should be robust enough to withstand operation in high repetition and extreme temperature situations), excitation requirements (e.g., the audio actuator 30 should not be constrained in a manner that eliminates all range of movement), and assembly requirements (e.g., the audio actuator 30 should be easily and efficiently locatable and installable within the vehicle body 12). Mounting solutions for mounting the audio actuators 30 within the vehicle body 12 in a manner that addresses the foregoing requirements are therefore proposed within this disclosure.

Figure 2:
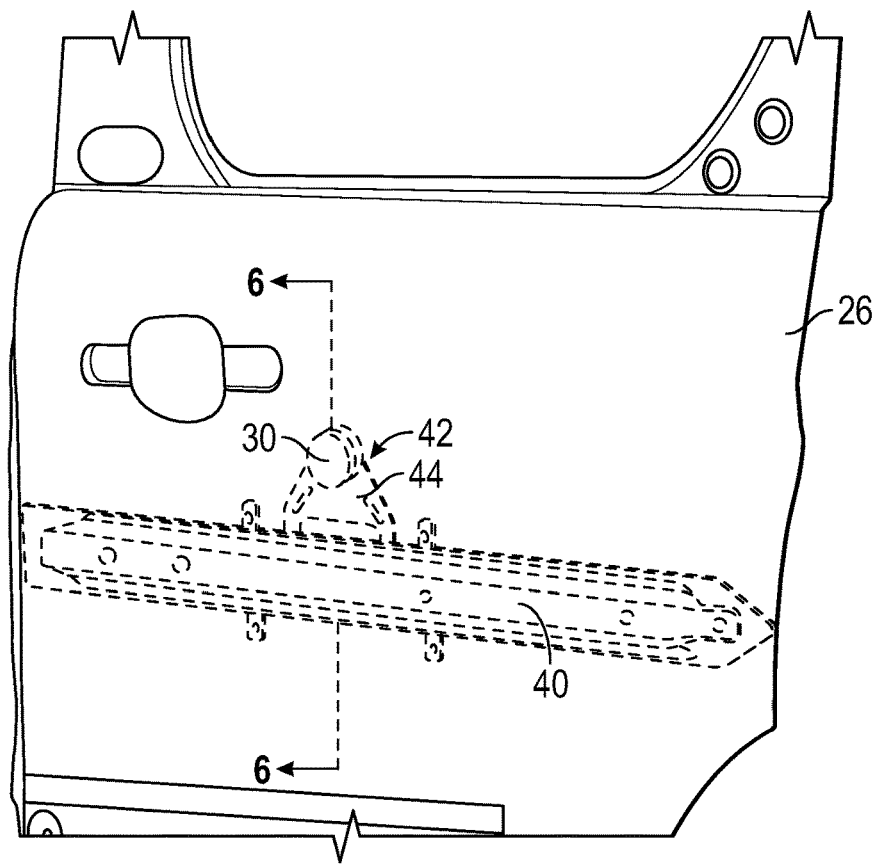
FIG. 2 illustrates an exemplary audio actuator assembly mounted inside a vehicle body component. In the illustrated embodiment, the vehicle body component is a door.

FIG. 2 illustrates a door 26 of the vehicle 10 of FIG. 1. The door 26 includes a reinforcement beam 40. The reinforcement beam 40 may alternatively be referred to as an anti-flutter beam. The reinforcement beam 40 extends longitudinally inside the door 26 and in a direction that is generally parallel to a longitudinal axis of the vehicle 10.

An audio actuator assembly 42 may be mounted to the reinforcement beam 40 of the door 26. The audio actuator assembly 42 may include an audio actuator 30 and a bridging bracket 44 that is configured for securing the audio actuator 30 in position relative to the reinforcement beam 40.

Figure 3:
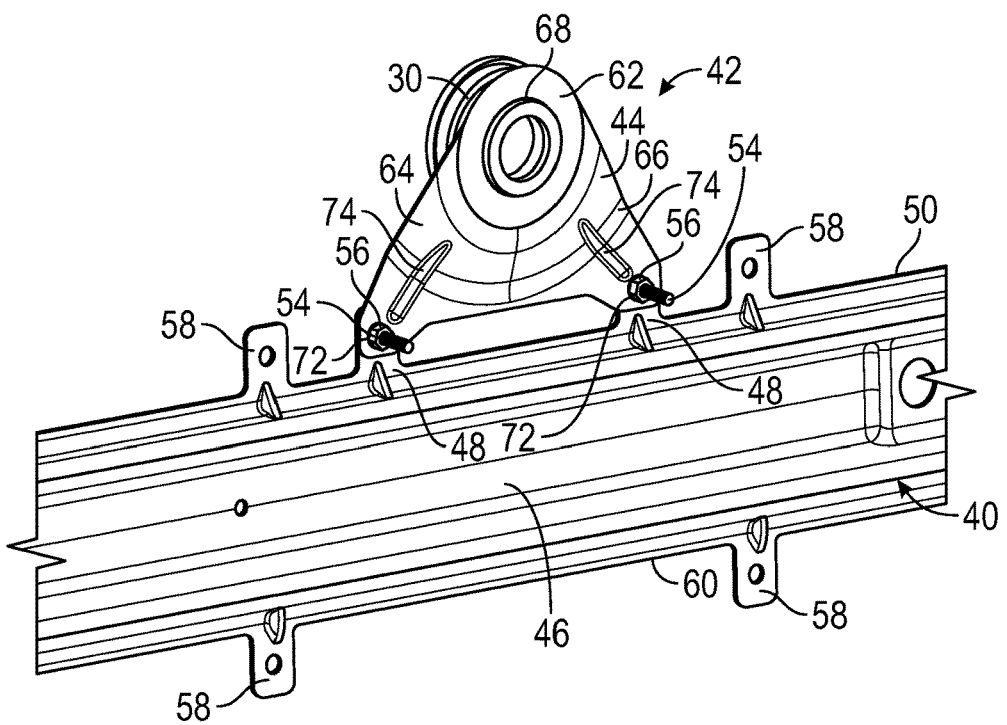
FIG. 3 illustrates the audio actuator assembly of FIG. 2 mounted to a door reinforcement beam.

Referring now primarily to FIGS. 3 and 4, the reinforcement beam 40 of the door 26 may include a main beam 46 and mounting tabs 48 that protrude laterally outwardly from the main beam 46. The total number of mounting tabs 48 provided on the reinforcement beam 40 is not intended to limit this disclosure. In an embodiment, each mounting tab 48 extends outwardly from a top edge 50 of the main beam 46 in a direction toward the roof 22 (see FIG. 1) of the vehicle 10.

Each mounting tab 48 may include an opening 52 that is sized to receive a mounting stud 54. The bridging bracket 44 of the audio actuator assembly 42 may be received over the mounting studs 54 and may be secured in place by securing a nut 56 onto threaded portions of each mounting stud 54 in order to mount the audio actuator assembly 42 within the door 26.

The reinforcement beam 40 of the door 26 may include a plurality of additional mounting tabs 58 that protrude laterally outwardly from both the top edge 50 and a bottom edge 60 of the main beam 46. The mounting tabs 58 are separate tabs from the mounting tabs 48 and are configured for securing the reinforcement beam 40 in place inside the door 26. The total number of the mounting tabs 58 is not intended to limit this disclosure.

In an embodiment, the mounting tabs 48 are positioned axially between two of the mounting tabs 58 that protrude from the top edge 50 of the main beam 46. Other configurations are further contemplated within the scope of this disclosure.

The bridging bracket 44 may include a mounting platform 62, a first leg 64, and a second leg 66. The first leg 64 and the second leg 66 may extend outwardly from the mounting platform 62 and may diverge apart from one another. Together, the mounting platform 62, the first leg 64, and the second leg 66 establish a single-piece, monolithic body of the bridging bracket 44. In an embodiment, the bridging bracket 44 is generally triangular shaped. However, the size, shape, and overall configuration of the bridging bracket 44 is not intended to limit this disclosure.

The mounting platform 62 of the bridging bracket 44 may include a central opening 68 that is sized and shaped to receive the audio actuator 30. In an embodiment, the audio actuator 30 is positioned via interference fit directly within the central opening 68 (see, e.g., FIG. 3). In another embodiment, a polymeric bearing 70 is positioned within the central opening 68 for receiving the audio actuator 30 (see, e.g., FIG. 5). The polymeric bearing 70 may be made of rubber or other suitable polymers to provide a more flexible mounting point for permitting some movement of the audio actuator 30 to occur during use.

The first leg 64 and the second leg 66 of the bridging bracket 44 may each include an opening 72 for receiving the mounting studs 54 when the bridging bracket 44 is positioned with respect to the mounting tabs 48 of the reinforcement beam 40. The nuts 56 that are secured to the threaded sections of the mounting studs 54 may be tightened down against the surfaces of the first leg 64 and the second leg 66 that surround the openings 72 in order to securely mount the audio actuator assembly 42 to the reinforcement beam 40.

In an embodiment, both the first leg 64 and the second leg 66 include a reinforcement rib 74. The reinforcement ribs 74 may optionally be provided to increase the overall strength of the bridging bracket 44.

The bridging bracket 44 may be made of metallic materials (e.g., steel, etc.), polymeric materials (e.g., polypropylene, nylon, etc.), or both. However, the specific material make-up of the bridging bracket 44 is not intended to limit this disclosure.

FIG. 6 is a cross-sectional view of the door 26 of FIG. 2, and FIG. 7 is a blown up view of a select portion of the door 26 of FIG. 6. The door 26 includes an outer skin 76, and inner skin 78, and a glass pane 80 disposed axially between the outer skin 76 and the inner skin 78. The outer skin 76 faces toward the exterior environment E, and the inner skin 78 faces toward an interior I of the vehicle 10.

The outer skin 76 may include an exterior panel 82. The exterior panel 82 includes an exterior surface 84 (sometimes referred to as a class A surface) and an interior surface 86 (sometimes referred to as the B-side of the class A surface). The reinforcement beam 40 may be mounted to the interior surface 86 of the exterior panel 82.

The inner skin 78 may include a support panel 88 and an interior trim piece 90 connected to the support panel 88. The support panel 88 is located axially between the interior trim piece 90 and the glass pane 80.

The audio actuator assembly 42 is mounted to the reinforcement beam and is therefore positioned in relatively close proximity to the interior surface 86 of the exterior panel 82. A clearance gap 92 may extend between the glass pane 80 and the audio actuator assembly 42. The clearance gap 92 is large enough to prevent the audio actuator assembly 42 from interfering with the raising and lowering of the glass pane 80.

In the mounted position shown in FIGS. 6-7, the audio actuator 30 includes an inner side 93 and an outer side 94. The outer side 94 may be secured to the interior surface 86 of the exterior panel 82 by an adhesive 96. In an embodiment, the adhesive 96 is a two-sided adhesive tape. However, other adhesives could alternatively be used to support the audio actuator 30 relative to the interior surface 86. Actuation of the inner side 93 of the audio actuator 30 causes the outer side 94 of the audio actuator 30 to positively contact the interior surface 86 of the exterior panel 82 of the door 26, thereby vibrating the interior surface 86 for achieving improved sound radiation to the exterior environment E.

Figure 8:
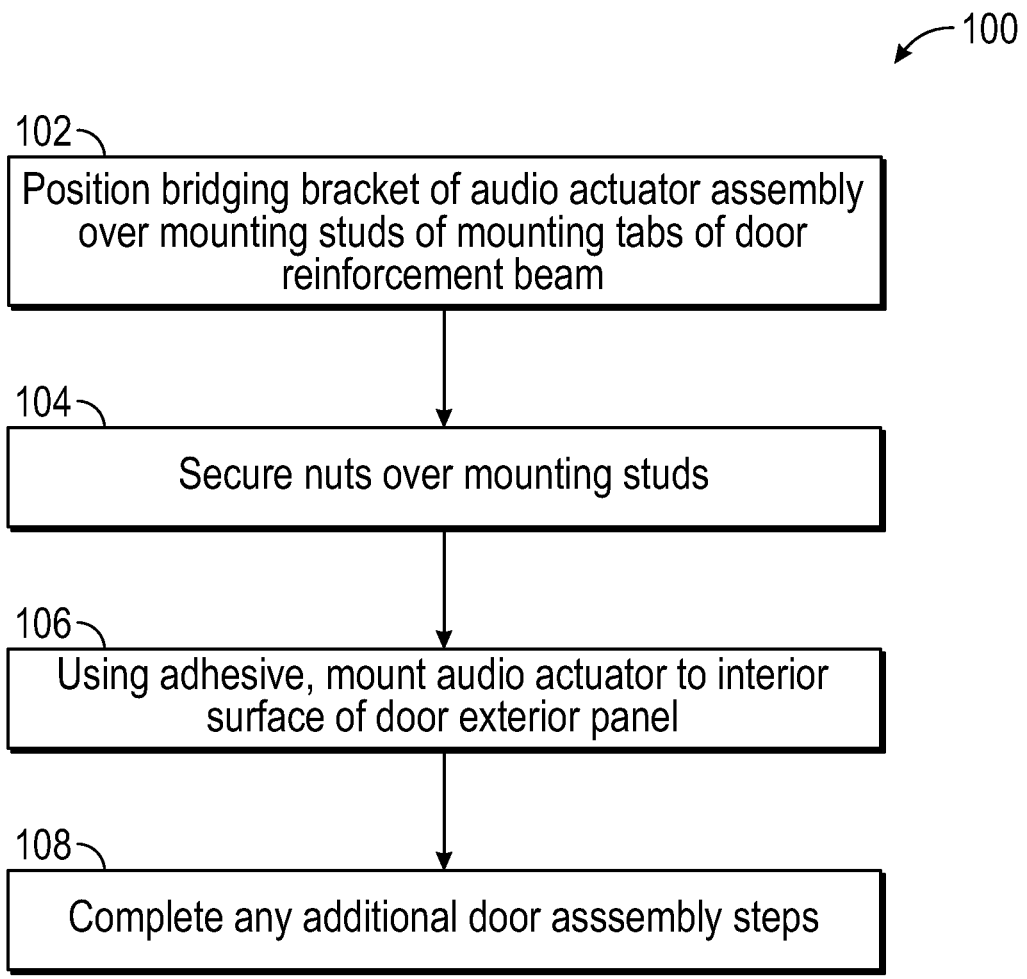
FIG. 8 schematically illustrates an exemplary vehicle assembly method for mounting an audio actuator assembly to a vehicle body component.

FIG. 8, with continued reference to FIGS. 1-7, schematically illustrates a vehicle assembly method 100. In an embodiment, the vehicle assembly method 100 can be employed for mounting the audio actuator assembly 42 within a vehicle body component, such as the door 26 of the vehicle 10.

First, at block 102, the bridging bracket 44 of the audio actuator assembly 42 is positioned over the mounting studs 54 of the mounting tabs 48 of the reinforcement beam 40. The audio actuator assembly 42 may be delivered to the final assembly plant as an assembly component, thereby simplifying the overall vehicle assembly process. The bridging bracket 44 is next secured in place at block 104 by securing the nuts 56 over the mounting studs 54. Next, a block 106, the audio actuator 30 of the audio actuator assembly 42 is mounted to the interior surface 86 of the exterior panel 82 of the door 26 by the adhesive 96. Additional assembly steps of the door 26 may be performed at block 108 to complete the method 100.

The audio actuator assemblies of this disclosure incorporate bridging brackets for mounting the audio actuators relative to a reinforcement beam. The audio actuators achieve positive contact with adjacent surfaces without the need for additional bracketry that is attached directly to the adjacent surfaces. The bridging bracket is connected to the reinforcement beam so that it will not move during excessive door slams and enables simple and efficient installation on the assembly floor.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An audio actuator assembly, comprising:
a bridging bracket; and
an audio actuator mounted within an opening of the bridging bracket,
wherein the bridging bracket includes a mounting platform, a first leg, and a second leg,
wherein each of the first leg and the second leg includes an opening, and a mounting stud is received within each of the openings,
wherein the mounting studs extend from mounting tabs of a reinforcement beam of a vehicle body component.

2. The assembly as recited in claim 1, wherein the bridging bracket is mounted to the reinforcement beam of the vehicle body component.

3. The assembly as recited in claim 2, wherein the vehicle body component is a door.

4. The assembly as recited in claim 1, comprising a nut secured to each of the mounting studs.

5. The assembly as recited in claim 1, comprising a polymeric bushing received within the opening and disposed between the opening and the audio actuator.

6. The assembly as recited in claim 1, wherein the bridging bracket is triangular shaped.

7. The assembly as recited in claim 1, comprising an adhesive attached to a surface of the audio actuator.

8. A vehicle, comprising:
a vehicle body component;
a bridging bracket secured within the vehicle body component; and
an audio actuator mounted to the bridging bracket,
wherein the vehicle body component is a door,
wherein the door includes a reinforcement beam, and the bridging bracket is secured to the reinforcement beam,
wherein the reinforcement beam includes a mounting tab, and a mounting stud extends from the mounting tab,
wherein the bridging bracket is received over the mounting stud.

9. The vehicle as recited in claim 8, wherein the door includes an exterior panel that includes an interior surface and an exterior surface, and the audio actuator is mounted to the interior surface.

10. The vehicle as recited in claim 9, comprising an adhesive applied between the audio actuator and the interior surface.

11. The vehicle as recited in claim 10, wherein the adhesive is a two-sided adhesive tape.

12. The vehicle as recited in claim 8, wherein the audio actuator is a vibration exciter.

13. The vehicle as recited in claim 8, wherein the audio actuator is received within a central opening of a mounting platform of the bridging bracket.

14. The vehicle as recited in claim 13, comprising a polymeric bearing positioned between the central opening and the audio actuator.

15. The vehicle as recited in claim 8, wherein the bridging bracket includes a mounting platform, a first leg, a second leg, a first reinforcement rib on the first leg, and a second reinforcement rib on the second leg.

* * * * *